Aug. 11, 1942.   D. C. VEDDER   2,292,678
APPARATUS FOR CLASSIFYING FRUITS AND VEGETABLES
Filed April 16, 1940   2 Sheets-Sheet 1
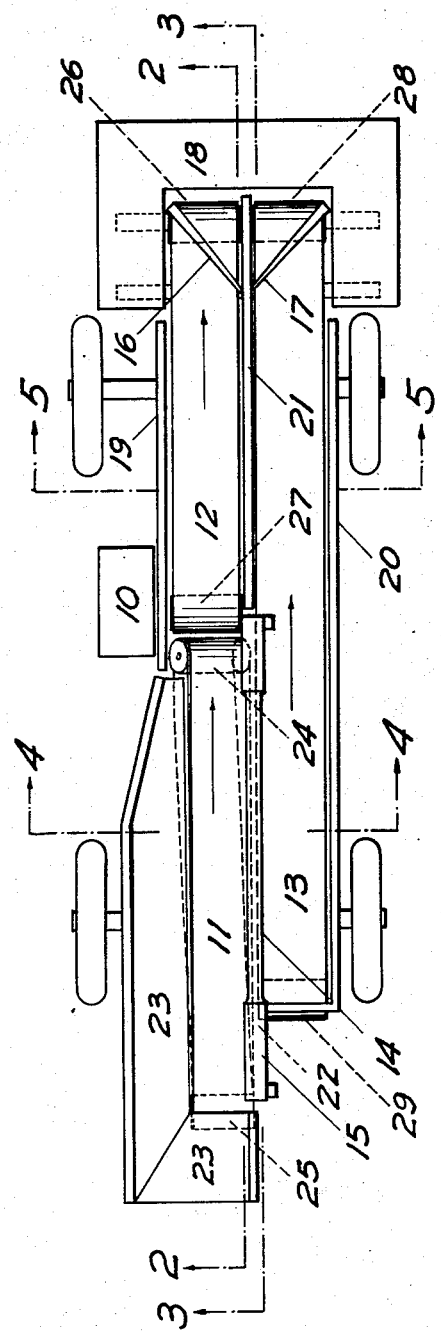
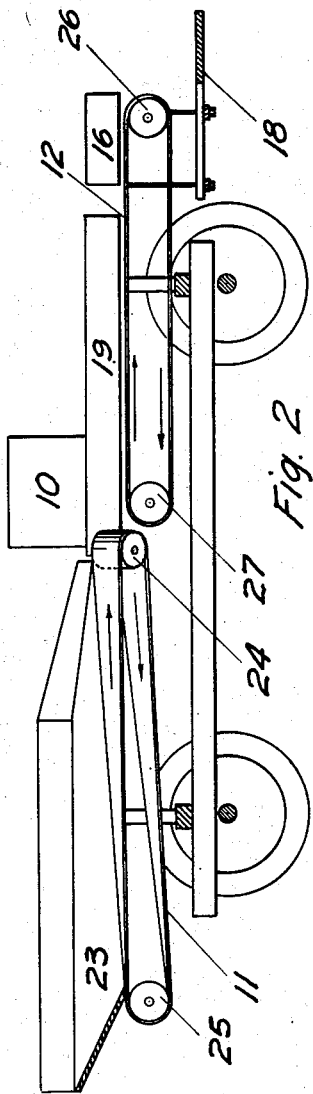
INVENTOR
David Claude Vedder
per
Robert S. Harris
Attorney Aug. 11, 1942.   D. C. VEDDER   2,292,678
APPARATUS FOR CLASSIFYING FRUITS AND VEGETABLES
Filed April 16, 1940   2 Sheets-Sheet 2
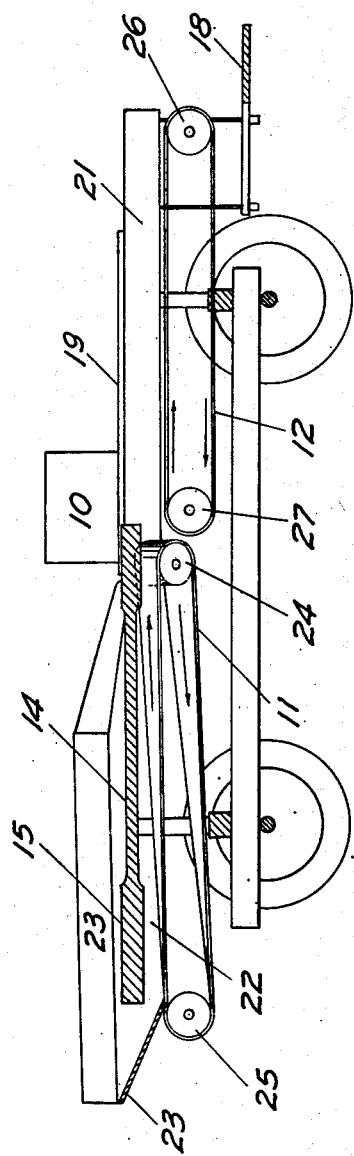
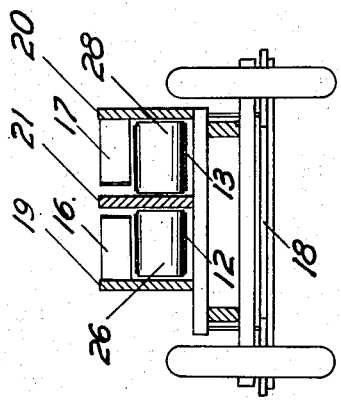
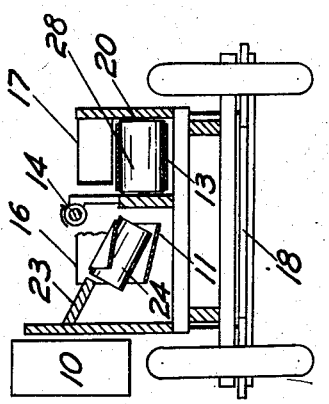
INVENTOR
David Claude Vedder
per Robert E. Harris
Attorney Patented Aug. 11, 1942

2,292,678

UNITED STATES PATENT OFFICE 2,292,678

APPARATUS FOR CLASSIFYING FRUITS AND VEGETABLES

David Claude Vedder, El Centro, Calif., assignor to California Fruit Growers Exchange, Los Angeles, Calif., a corporation of California Application April 16, 1940, Serial No. 329,866

5 Claims. (Cl. 209—103)

This invention relates to a device for classifying fruits and vegetables according to size. While the apparatus comprising this invention is applicable for general use in sizing many kinds of fruits and vegetables, it is particularly well adapted for use in sizing grapefruit. The device of this invention is of value to the orchardists and packing houses where sizing specifications are of importance and must be taken into account.

Prior to my invention, it has been customary to transfer the picked fruit from the grove or orchard to the packing house for classification as to quality and size. Usually the packing house operations have been carried out at a point close to the railroad, necessitating the transportation of the fruit from the orchard to the packing house. In many cases the fruit is transported several miles, and not infrequently as far as 25 or 30 miles. In order to reduce the cost of transporting the fruit from the grove to the packing house, it has been suggested that in place of transporting all of the fruit picked to the packing house and then hauling away that portion of the fruit which was rejected due to being undersized or for other reasons, perhaps the fruit could be sized and/or graded in the field. It was soon found, however, that equipment adapted for such use was not available, and, accordingly, this two-way transportation of fruit is still practiced.

In order to eliminate this vexing problem and to reduce the transportation costs of the fruit, I conceived and hereby disclose a simple apparatus or device whereby the fruit may be classified into several size classifications prior to its transportation from the orchard. My invention, therefore, results in a substantial saving to the orchardists in transportation costs, and that fruit which, because of its size is not acceptable for particular commercial purposes is segregated and left at the site of the picking operations, or used in some other way.

More specifically, this invention relates to a device which is adapted to be operated in the orchard or grove, as distinguished from those devices which are designed and constructed for operation in the packing house.

It is, therefore, an object of my invention to provide and disclose a fruit sizing apparatus so constructed that the device is adapted for use in the field or orchard.

More particularly, it is an object of this invention to provide a fruit sizing apparatus which may be operated in the field or orchard and which is readily portable.

Further objects and advantages of the present invention will become apparent to those skilled in the art as the description proceeds in connection with the accompanying drawings, in which:

Fig. 1 is a plan view of the fruit sizing device.

Fig. 2 is a vertical, sectional and side elevational view taken along the line 2—2 of Fig. 1.

Fig. 3 is a vertical, sectional and side elevational view of the apparatus taken along the line 3—3 of Fig. 1, and shows the relationship of the feed belt, sizing roll, and discharge belt.

Fig. 4 is a cross-sectional view taken along the line 4—4 of Fig. 1.

Fig. 5 is a cross-sectional view taken along the line 5—5 of Fig. 1.

Corresponding and like parts are referred to in the following description and are indicated in all views of the drawings by the same reference numbers.

Referring now to the drawings in detail, it will be apparent that the apparatus is provided with a frame supporting the various parts. The frame includes the wheels, axles, and other supporting members generally. As operating parts carried on the frame, there is an engine 10 suitably connected by mechanism not shown, so as to drive the various operating parts, and, in particular, a feed belt 11, discharge belts 12 and 13, and a sizing roll 14. The sizing roll 14 is of larger diameter at its rear end, as indicated by the numeral 15. In conjunction with and cooperating with the operating parts are the take-off boards 16 and 17. At the forward ends of the discharge belts 12 and 13, there is suspended from the frame a receiving box platform 18. The side boards 19 and 20 prevent the fruit from rolling off at the sides of the discharge belts 12 and 13. The center board 21 separates the discharge belts 12 and 13 and prevents fruit from passing from one belt to the other. The space beneath that portion of the sizing roll indicated at 15 is referred to as the "drop out" 22 which permits elimination of relatively small fruit. A sloping dumping table 23 is provided, from which the fruit rolls to the feed belt 11. The feed belt 11 operates in conjunction with the inclined belt roll 24 at its forward end and belt roll 25 at its rear end. Discharge belt 12 operates in conjunction with belt roll 26 at its forward end and belt roll 27 at its rear end. The discharge belt 13 operates in conjunction with the belt roll 28 at its forward end and belt roll 29 at its rear end. The direction of motion of the feed belt 11 and discharge belts 12 and 13 is indicated by the arrows in Figs. 1, 2, and 3, and the direction of motion of the sizing roll 14 is shown by the arrow in Fig. 4.

Motivating power for my invention is supplied by an engine indicated at 10 and is transferred from the engine to the feed belt 11 and discharge belts 12 and 13 by any suitable driving mechanism not shown herein. The sizing roll 14 is also driven by any suitable means not shown. The means for accomplishing and transmitting power from the engine to the belts and sizing roll may be varied within wide limits, depending upon their adaptability to the particular circumstances.

The operation of my sizing apparatus illustrated in the drawings, is as follows:

The operator empties a quantity of fruit upon the dumping table 23, from which, due to the slope of the table, the fruit rolls onto the feed belt 11 operating in conjunction with the belt rolls 24 and 25. Due to the angle of inclination of the belt roll 24, the feed belt 11 operates to keep the fruit in contact with the sizing roll 14 as the fruit moves forward along the belt. Fruit of small size will pass under the sizing roll at 15 and fall through the space indicated as the drop out 22. Since the discharge belt 13 does not extend as far toward the rear of the apparatus as the feed belt 11 and the roll 14, fruit passing through the space 22 will be discharged to the ground. Of course, a suitable means for the collection of this small fruit may be provided if desired. Fruit which is sufficiently large to be retained upon the feed belt 11 but small enough to pass under the sizing roll 14 beyond the drop out space, will pass onto the discharge belt 13 and finally be conveyed to a receptacle on the receiving box platform. This receptacle may be at the end of the belt or to one side of the belt, the take-off board 17 being used to direct the fruit to the desired receptacle. Fruit which is too large to pass under the sizing roll 14 will be conveyed along the feed belt 11 and finally pass over the take-off apron, if one is provided, and onto the discharge belt 12. From the discharge belt 12 the fruit will pass to a receptacle on the receiving box platform. By means of the take-off board 16 the fruit may be directed to a receptacle positioned at the end of the discharge belt 12 or into a receptacle at one side of the end of this belt. The center board 21 prevents fruit from passing from the discharge belt 12 to the discharge belt 13 or vice versa.

It is to be noted that by means of this apparatus fruit may be separated into three classifications, namely, the extremely small size fruit which is eliminated at the drop out, and the separation of the remaining fruit into two size classifications, depending upon whether they pass under the sizing roll or are held back by the sizing roll. It is obvious that the space beneath the sizing roll 14 and the feed belt 11 may be adjusted to separate fruits of various diameters merely by raising or lowering the sizing roll.

The power means for operating the feed and discharge belts and sizing roll may be a gasoline engine or any other suitable power source.

In referring to this invention as applicable to the classification of "fruit," it is to be understood that the term "fruit" is used in a broad sense to include not only citrus fruit, apples, etc., to which the term is usually applied, but also to include vegetables which may be satisfactorily sized by my device.

It is to be presumed that variations will occur to those skilled in the art with respect to the particular arrangement of the apparatus or kind of apparatus used. For example, a modification of my device may be used wherein one or both of the discharge belts are dispensed with and the fruit received in boxes placed at the end of the feed belt and alongside of and below the sizing roll. Furthermore, a sizing roll may be employed having portions of its length of varying thickness so as to separate out more than two sizes of fruit. My device is not limited, therefore, to the specific arrangement of the various parts referred to herein for illustrative purposes. Any and all changes, modifications, and alterations in the apparatus coming within the scope of the appended claims are intended to be embraced thereby.

Having thus fully described my invention in such clear, concise, and exact terms as to enable others skilled in the art to use the same, I claim as my invention and desire to secure by Letters Patent the following.

I claim:

1. A portable fruit sizing machine having a supporting frame, said machine comprising a sloping dumping table adapted to direct fruit onto a forward moving feed belt, said feed belt passing at its rear end over a horizontal belt roll and at its forward end over an inclined belt roll, a rotating sizing roll positioned above and to one side of the feed belt and extending the full length of the feed belt, a minor length of said sizing roll being of greater diameter than its main length, a horizontal forward moving discharge belt in juxtaposition to the feed belt, the rear end of said discharge belt lying ahead of the rear end of the feed belt a distance equivalent to the length of the sizing roll having the larger diameter, said discharge belt being adapted and positioned so as to carry forward fruit passing from the feed belt under the portion of the sizing roll having the lesser diameter, said discharge belt being so adapted to carry the sized fruit forward for deposition in receiving receptacles, a second horizontal forward moving discharge belt in line with and extending beyond the feed belt, said second discharge belt being positioned to receive the fruit passing over the forward end of the feed belt and further adapted to carry the fruit forward to receiving receptacles placed on a receiving platform at the forward end of the discharge belts.

2. A portable fruit sizing machine having a supporting frame, said sizing machine comprising a sloping dumping table adapted to direct fruit onto a forward moving feed belt, said feed belt passing at one extremity over a horizontal belt roll and at its other extremity over an inclined belt roll, a forward moving discharge belt in juxtaposition to the feed belt, a second discharge belt directly in line with the feed belt and extending beyond the forward end thereof and adapted to receive the fruit from the feed belt, said second discharge belt positioned alongside of and in the same plane as the first mentioned discharge belt, being separated therefrom by a center board, a horizontal rotating sizing roll having a minor portion of its length of greater diameter than the main length and positioned above and between the first discharge belt and the feed belt, said sizing roll extending the full length of the feed belt, the portion of the sizing roll with the greater diameter having no discharge belt thereunder, a receiving platform at the forward ends of the discharge belts adapted to hold fruit receiving receptacles, take-off boards positioned over said discharge belts and adapted to direct the fruit into the receiving receptacles.

3. A portable fruit sizing device comprising a dumping table, a forward moving feed belt, said dumping table being adapted to direct fruit onto said forward moving feed belt, a rotating sizing roll adjustably positioned above and to one side of the feed belt, said feed belt being horizontal at its rear end and inclined by substantially uniformly increased inclination toward the sizing roll at the forward end of said feed belt, a forward moving discharge belt in juxtaposition to the feed belt, said discharge belt being adapted and positioned so as to carry forward at least a portion of the fruit passing under the sizing roll, a second horizontal, forward moving discharge belt in line with and extending beyond the feed belt, said second discharge belt being adapted and positioned to carry forward fruit passing over the forward end of the feed belt.

4. A fruit sizing device comprising a forward moving feed belt, a rotating sizing roll adjustably positioned above and to one side of the feed belt, said feed belt being horizontal at its rear end and inclined by substantially uniformly increased inclination to the sizing roll toward the forward end of said feed belt.

5. A fruit sizing device comprising a dumping table, a forward moving feed belt, said dumping table being adapted to direct fruit onto said forward moving feed belt, a rotating sizing roll having the rear portion of its length of greater diameter than the forward portion, said sizing roll being adjustably positioned above and to one side of the feed belt, said feed belt being horizontal at its rear end and progressively inclined by substantially uniformly increased inclination to the sizing roll toward the forward end of said feed belt.

DAVID CLAUDE VEDDER.